United States Patent [19]

Peiffer

[11] Patent Number: 4,910,248

[45] Date of Patent: Mar. 20, 1990

[54] MIXTURES OF COLLOIDAL ROD-LIKE VISCOELASTIC FLUIDS AND ANIONIC-ALKYL CONTAINING COPOLYMERS

[75] Inventor: Dennis G. Peiffer, East Brunswick, N.J.

[73] Assignee: Exxon Research and Engineering Company, Florham Park, N.J.

[21] Appl. No.: 135,830

[22] Filed: Dec. 21, 1987

[51] Int. Cl.$^4$ .............................................. C08K 0/00
[52] U.S. Cl. ...................................... 524/535
[58] Field of Search ......................................... 524/535

*Primary Examiner*—Joseph L. Schofer
*Assistant Examiner*—J. M. Reddick
*Attorney, Agent, or Firm*—Richard E. Nanfeldt

[57] ABSTRACT

A solution comprising (a) water; and
(b) about 0.01 to about 10 weight % of a water soluble polymerizable monomer characterized by the formula:

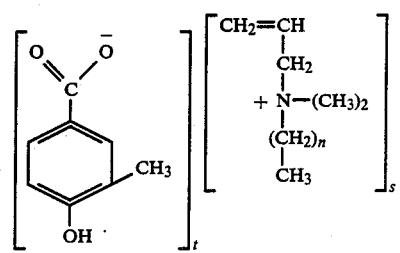

wherein n is a 6-22 straight chained or branched chained alkyl or cycloalkyl group and the ratio of t to s is about 1/5 to 5/1.

5 Claims, 4 Drawing Sheets

MIXTURES OF COLLOIDAL ROD-LIKE VISCOELASTIC FLUIDS AND ANIONIC-ALKYL CONTAINING COPOLYMERS

BACKGROUND OF THE INVENTION

It is well known that polymeric materials are generally considered useful as viscosification agents when dissolved in an appropriate solvent system. The major reason for this viscosity enhancement is due to the very large dimensions of the individual polymer chain as compared to the dimension of the single solvent molecules. Any increase in the size of the polymer chain will produce a corresponding enhancement in the viscosity of the solution. This effect is maximized when the polymer is dissolved in a "good" solvent. Therefore, in general, a soluble polymer is useful for thickening solvents, while a water soluble polymer is appropriate for increasing the viscosity of aqueous systems. With regard to aqueous solutions, solvent soluble nonionic polymers and high charge density sulfonated or carboxylate polyelectrolytes are quite useful in this regard and are commonly used materials. However, the solution properties of the former family of materials are controlled primarily through modification of the molecular weight of the polymer and through changes in the level of dissolved polymer. These materials become especially effective at concentrations where the individual polymer chains begin to overlap. This "transition" is commonly referred to in the literature as the chain overlap concentration or simply $C^*$. It should be noted that in most nonionic polymers of commercial interest, a relatively large amount of polymer is required prior to reaching $C^*$. Therefore, this approach is undesirable from an economic viewpoint. Moreover, the rheological properties of many of these nonionic systems have been published. The results of these studies show that, in general, these solutions are shear thinning over all shear rates investigated.

Polyelectrolytes, on the other hand, are very useful and the most commonly used materials. However, the solution properties of these materials begin to deteriorate as low molecular additives (i.e., acids, bases or salts) are dissolved in the solution. These additives screen the charges that are fixed along the chain backbone which results in a decrease in the dimensions of the polymer molecule. The viscosity diminishes as long as the chain continue to shrink.

It has been found previously (U.S. Pat. Nos. 4,460,758 and 4,540,496), for example, that intrapolymer complexes, composed of a nonstoichiometric ratio cationic and anionic monomeric units, can be useful in viscosifying aqueous solutions systems (as required in a variety of well control and workover fluids; i.e., water based drilling fluids and acid gelation systems). More importantly, these polymeric materials possess higher viscosity in acid, base or salt solution than in the corresponding fresh water system. Even more interesting is the observation that these polymeric materials show a corresponding viscosity enhancement as the concentration of the dissolved acid, base or salt is increased, even through the polyampholyte contains a substantial amount of dissociable charge. As explained earlier, these viscosity results are unexpected since the general tendency of charged macromolecules in these types of aqueous solutions shows a marked decrease in thickening efficiency.

Furthermore, in recent years, interpolymer complexes have received considerable attention in the literature due to their interesting and unique properties. In most instances, these complexes are formed by intimately mixing aqueous solutions containing high-charge density polyelectrolytes possessing opposite charge. When these polymer molecules meet in solution, the interaction between oppositely charged sites will cause the release of their associated counterions forming the complex. The counterions are now free to diffuse into the bulk solution. Normally, phase separation occurs upon prolonged standing in these high-charged density complexes. As a result, these materials have poor viscosification properties. In previous U.S. patents it is reported that low-charge interpolymer complexes are soluble and effective in viscosifying aqueous solution systems. More importantly, these complexes possess a substantially higher viscosity than the corresponding individual low-charge density copolymer components. As detailed earlier, these characteristics are unexpected since high-charge density complexes are insoluble in these conventional solution systems.

Even more interesting is the unique and unexpected result that these soluble interpolymer complexes are capable of enhancing the viscosity of aqueous solutions under relatively broad shear conditions. With these unique polymeric materials, dilatant behavior occurs in aqueous fluids which are of extreme technological utility. It is further noted that under the identical experimental conditions, the viscosity of the individual copolymer components show the normal shear thinning behavior.

The instant invention teaches that a novel family of mixtures of unhydrolyzed copolymers and colloidal rod-like viscoelastic fluids are useful in thickening fresh and high brine solutions even under shear. In addition, these mixtures have markedly improved and unique solution properties as compared to the individual components and even as compared to conventional water soluble polymers. Finally, these copolymers do show a very modest shear thickening phenomena under certain controllable conditions.

In addition, the instant invention teaches that a novel family of mixtures of carboxylated (via hydrolysis techniques) copolymers containing a novel family of sulfonate-alkyl containing monomer moieties and colloidal viscoelastic fluids are useful in viscosifying aqueous solvent systems and more importantly, these mixtures have markedly improved and different solution properties as compared to conventional water soluble polymers and even as compared to the individual components of the mixture itself. These copolymers are based on, but not limited to, the incorporation of the above anionic monomers into an acrylamide backbone structure.

It is well known that polyacrylamide and hydrolyzed polyacrylamide are water soluble polymers that have been previously disclosed in the literature and have found application in the viscosification of aqueous solutions. This is achieved through a combination of high molecular weight and chain expansion due to repulsion of pendant ionic groups along the polymer chain. However, high molecular weight polymers present well known difficulties in manufacture and subsequent processing because of their irreversible degradation when exposed to conditions of high shear such as would be obtained in the usual stirring devices. Moreover, the presence of pendant ionic groups leads to solution properties which are markedly influenced by the presence of dissolved cations. In particular, the viscosity of solutions of these polymers usually decreases strongly upon increasing concentrations of brine.

The instant invention teaches an alternative means for providing polymers which viscosify water or brine at low concentrations. This method relies on the incorporation of a small amount of hydrophobic groups into a polymer with a water soluble backbone. These hydrophobic groups tend to associate with one another in an aqueous solution, and when the association occurs intermolecularly, the solution viscosity may be increased relative to the polymer without the hydrophobic side groups. An additional benefit is that the solution viscosity is relatively insensitive to salts because the hydrophobic groups are not ionic.

The synthesis of copolymers composed of water soluble and water insoluble monomers presents difficulties. In order for polymerization to be effected, the monomers must obviously come into close proximity to one another. A variety of processes based upon prior art could conceivably achieve this, but have serious deficiencies, necessitating the instant invention. For example, simply dispersing the water insoluble monomer as fine particles in the aqueous medium, while dissolving the water soluble monomer in water would result in poor incorporation of the water insoluble monomer and would lead to a heterogeneous product of particles dispersed in the predominantly water soluble polymer. This would therefore require the extra step of separating the unreacted monomer particulates from the reaction product.

Conventional emulsion polymerization, which uses a surfactant to disperse the water insoluble monomer into the aqueous medium containing the dissolved water soluble monomer, has other disadvantages. In this process, the bulk of the water insoluble monomer is contained initially in These droplets must be stabilized against coalescence by a combination of agitation and added surfactant. The product copolymer is usually in the form of particulates with diameters on the order of 500 to 2000Å in diameter.

Alternatively, both monomers may be dissolved in a solvent or solvent mixture having properties intermediate between water and a hydrocarbon solvent. Although this undoubtedly allows the comonomers to come into close proximity to one another, since the dispersion is on a molecular scale, this process presents other difficulties. For example, often the copolymer is insoluble in the mixed solvent which is capable of solubilizing the monomers. This leads to precipitation of the copolymer when it has a molecular weight which is still too low to produce efficient viscosification. The reaction product is usually heterogeneous which therefore requires a disadvantageous additional processing step. Furthermore, the water miscible solvents such as alcohols, acetone, ethers and acetic acid are fairly good chain transfer agents and when used in reasonable quantities would lead to decreased molecular weights and hence poor viscosification efficiency.

It should be noted in this regard that the use of hydrophobic groups on water soluble polymers to enhance the rheological properties of water based fluids has been described. One approach to provide polyacrylamide based systems containing hydrophobic groups is described by Bock, et al., U.S. Pat. No. 4,520,182 and 4,528,348. Water soluble acrylamide copolymers containing a small amount of oil soluble or hydrophobic alkylacrylamide groups were found to impart efficient viscosification to aqueous fluids. Landoll, U.S. Pat. No. 4,304,902, describes copolymers of ethylene oxide with long chain epoxides which also required relatively large polymer concentration (approximately 1%) for thickening water and required surfactants for solubility due to irregularities in the polymerization. In a related case, U.S. Pat. No. 4,4528,277, modified nonionic cellulose ether polymers are described. Although these polymers show enhanced viscosification relative to polymers not containing hydrophobic groups, the viscosification efficiency was very low, requiring 2 to 3 weight percent polymer to provide an enhancement. The use of surfactants to enable solubility and, in turn, viscosification, by a water soluble polymer containing hydrophobic groups is described by Evani, U.S. Pat. No. 4,432,881. The hydrophobic groups claimed are attached to the polymer via an acrylate linkage which is known to have poor hydrolytic stability. In addition, the need for a surfactant to achieve solubility and thickening efficiency should make such a system very salt sensitive, as well as very sensitive to small changes in surfactant and polymer concentrations. Emmons, et al., U.S. Pat. No. 4,395,524, teaches acrylamide copolymers as thickeners for aqueous systems. While these polymers possess hydrophobic groups they are prepared using alcohol containing solvent which are known chain transfer agents. The resulting polymers have rather low molecular weights and, thus, relatively high polymer concentrations are required to achieve reasonable viscosification of water based fluids.

We report in patent application Attorney Docket Nos. C-2193 and C-2199 the finding that a novel family of cationic-alkyl containing monomers, i.e. polymerizable moieties, form large structures in solution. The dimensions of these structures are comparable to those of polymeric chains. As a result, these structures formed from these monomers are useful and very effective viscosifiers for aqueous solutions. In addition, these monomers have markedly unique and improved solution properties, as compared to conventional water soluble polymers. These fluids formed with these monomers can adequately be described as polymerizable cationic viscoelastic monomer fluids. In addition, these monomers have markedly unique and improved solution properties in high brine environments, as compared to conventional water soluble polymers.

These monomers are based on, but not limited to, the incorporation of the above cationic monomers into an aqueous fluid system. In addition, these monomers are not incorporated into a polymer chain structure via conventional synthetic techniques to form hydrophobically-associating type polymers. Very effective rheological control is assured even without the need to form a hydrophobically-associating polymer.

SUMMARY OF THE INVENTION

The instant invention describes a process for producing highly viscoelastic and highly effective rheological control agents through the intimate mixing of a cationic colloidal rod-like viscoelastic fluid and an anionically-charged hydrophobically interacting polymer. This process relies on the addition of hydrophobically-associating water soluble polymers to a solution containing a colloidal rod-like viscoelastic fluid (and vice versa). Both individual components in water produce a clear, uniform and homogeneous solution as does the intimate mixture of the two components. Furthermore, the individual components by themselves give to aqueous solutions a number of technologically important attributes such as shear thickening, salt insensitivity, emulsification properties and the like. However, the instant process of mixing the two individual components results in a clear, homogeneous solution that has superior properties to either component and permits one to have a markedly improved degree of control of the rheological properties of aqueous media.

DETAILED DESCRIPTION OF THE INVENTION

Figure 1:
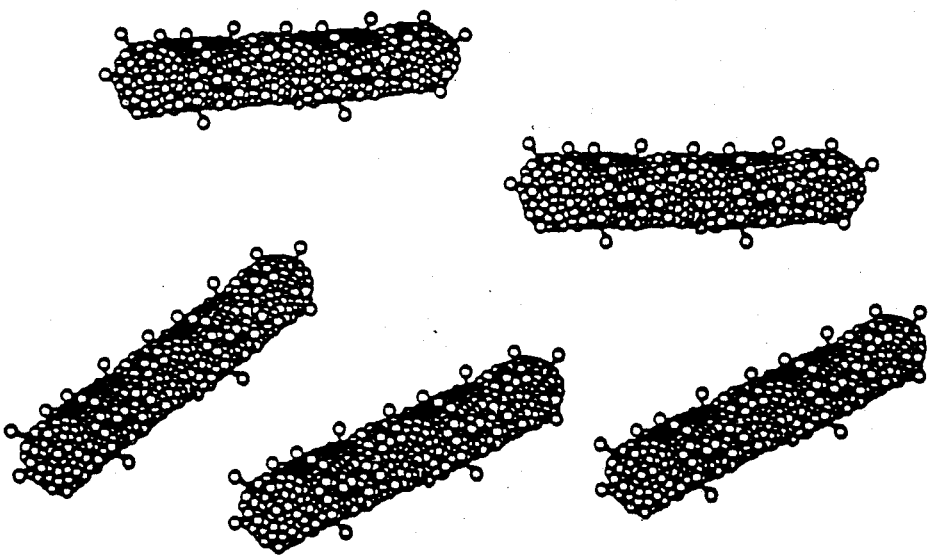
FIG. 1 depicts the rod-like structures of the instant invention.

The process of this invention markedly enhances the rheological properties of aqueous media. In particular, it enables one to control solution properties by mixing a water soluble monomer, acrylamide, and water soluble monomers such as an amidoalkyl sulfonate to give copolymers which alone are efficient aqueous viscosifiers. With viscoelastic colloidal monomer fluids which also are very effective rheological control additives. The resultant intimate mixture now possess properties that are completely different and superior to that of the individual components.

With regard to the above copolymers, the instant process relies on the solubility of the alkyl derivatives into a predominantly aqueous media, these anionic derivatives form micelles without the utilization of any other surfactant. The reaction mixture is isotropic, clear, and homogeneous. These micellar reaction mixtures are free of visible oil droplets or particulates of the water insoluble monomer. The polymerization can therefore be initiated by water soluble initiators to give copolymers that are substantially free of visible particulates. The resultant reaction product remains homogeneous throughout the course of the reaction.

Micelles formed by the anionic (sulfonate) monomers which are water soluble are generally very small aggregates which consist of on the order of 50 to 200 molecules. They form spontaneously upon mixing the components together, i.e., they do not require the vigorous mixing conditions required in conventional emulsion polymerization in which macroemulsions are formed. The macroemulsion droplets of the conventional emulsion polymerization process have diameters which are at least 10,000Å. They therefore tend to phase separate upon standing, leading to undesirable inhomogeneities in the produced copolymer. The homogeneous micellar reaction mixture is, on the other hand, much more stable against demixing than the formulations used in emulsion polymerization processes. Indeed, no stirring is required during the course of the micellar copolymerization—the micellar aggregates remain extremely finely dispersed throughout. Moreover, the extremely dispersed nature of the micellar aggregate permits the copolymerization to occur in such a way that a water soluble copolymer is produced which does not contain particulates or latexes of water insoluble polymers. These would be detrimental in such applications as secondary oil recovery, which requires a product which is substantially free of pore plugging particulates.

An additional important feature of the instant invention is that the resultant copolymer possess both a anionic charge and a hydrophobic unit on the polymer chain without the necessity of further chemical post-treatment. Besides the ease of polymerization to form these hydrophobically associating polymers, the anionic and alkyl group, i.e., hydrophobic entity, gives one a great degree of control of the final polymer structure and of course, physical properties. Surfactants, although unnecessary as described above, can still be used.

The surfactants which may be used in this process may be one of the water soluble surfactants such as salts of alkyl sulfates, sulfonates, carboxylates and the like, or nonionic such as ethylene oxide-propylene oxides copolymers or polyoxyethylene alkyl ethers, etc., or cationic surfactants such as primary alkylamines, dialkyl secondary amines, or ethoxylated fatty amines. Suitable surfactants may be chosen from these on the basis of water solubility and solubilization capacity for any other water insoluble monomers intentionally added to the polymerization mixture.

Suitable free radical initiators for the copolymerization process are peroxides such as hydrogen peroxide, potassium persulfate, alkyl peroxides and the like. The concentration of the free radical initiator is about 0.01 to about 0.50 grams per hundred grams of acrylamide and alkylacrylamide monomer. The polymerization is conducted in the absence of oxygen at a temperature of about 20° to about 100° C. The polymer may be recovered from the reaction mixture by precipitation by nonsolvents such as acetone.

It should be pointed out that neither the mode of polymerization (solution, suspension, emulsion, microemulsion or micellar polymerization technique and the like) nor the initiation is critical, provided that the method or the products of the initiation step does not inhibit production of polymer the chemically modify the initial molecular structure of reacting monomers.

The water soluble copolymers which are produced by the copolymerization process of the instant invention are characterized by the formula:

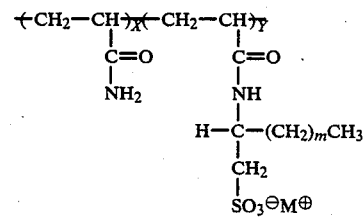

wherein m is preferably 6 to 22, more preferably 6 to 20 and most preferably 6 to 18. Typical, but non-limiting examples of preferred alkyl groups are hexyl, octyl, decyl, dodecyl and stearyl groups. X is preferably about 90 to 99.9 mole %, more preferably about 95.0 to about 99.8 mole %, and most preferably about 97.0 to about 99.5 mole % and Y is preferably about 10 to about 0.1 mole %, more preferably about 5.0 to about 0.2 mole %; and most preferably about 3.0 to about 0.5 mole %. These water soluble copolymers are of a sufficiently high molecular weight that they are efficient viscosifiers of water or brine, but not so high that they are readily susceptible to irreversible shear degradation. That is, their intrinsic viscosity is greater than 1 dl/g and less than about 10 dl/g. M is a tertiary amine or a metal cation selected from the group consisting of aluminum, iron, lead, and Groups IA, IIA, IIb and IIB of the Periodic Table of Elements.

The water soluble terpolymers which are produced by the copolymerization process of the instant invention are characterized by the formula:

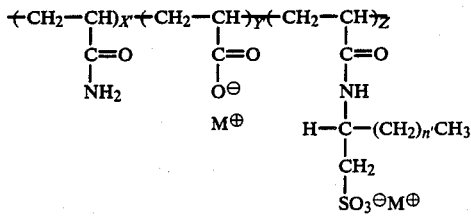

wherein n' is preferably about 6 to about 22, more preferably 6 to 20 and most preferably 6 to 18. Typical, but nonlimiting examples of preferred alkyl groups are hexyl, octyl, decyl, dodecyl and hexadecyl groups. X' is preferably about 90.0 to about 99.9 mole %, more preferably about 95.0 to about 99.8 mole %, and most preferably about 97.0 to about 99.5 mole % and $Y' = 100 - (X' + Z)$ and Z is about 0.1 to 5.0 mole %. These water soluble copolymers are of a sufficiently high molecular weight that they are efficient viscosifiers of water or brine, but not so high that they are readily susceptible to irreversible shear degradation. That is, their intrinsic viscosity is greater than about 1 dl/g and less than about 10 dl/g. M is a tertiary amine or a metal cation selected from the group consisting of aluminum, iron, lead and Groups IA, IIA, IB and IIB of the Periodic Table of Elements.

With regard to the second component of this mixture, i.e. the colloidal viscoelastic fluid, we note that the particular structures formed via monomers derived from the reaction of allyl halide with N,N-dimethylalkylamines are rod-like in nature and as a result, aqueous solution containing these structures have properties comparable to relatively high molecular polymers. These structures form without the utilization of any other surfactant or rod-like polymers.

The instant process relies on the appropriate choice of an anionic counterion which is attracted to the cationic charge present on the cationic-hydrophobic monomer. The counterions are usually those that are not very soluble in water and surprisingly when attached to the cationic monomer spontaneously forms the rod-like structures resulting in viscoelastic monomer fluids. These fluids have solution properties comparable to excellent water soluble polymeric viscosifiers. It should be noted that dilute solutions of ionic and nonionic surfactants and detergents usually behave as Newtonian liquids, i.e. viscoelastic behavior is rare.

A criterion for the formation of these polymerizable cationic viscoelastic aqueous fluids can be approximated with the theometical considerations of D. J. Mitchell and B. W. Ninham, J. Chem. Soc., Faraday Trans 2, 77, 601 (1981) and J. N. Israelachvili, D. J. Mitchell and B. W. Ninham, J. Chem. Soc., Faraday Trans 2, 72, 1525 (1976). The first consequences of packing conditions of these cationic monomers with the appropriate anionic counterion are applied under the assumptions of (1) constant volume v per monomer molecules and (2) constant headqroups area $a_o$ for a monomer molecule. In general, since the radius of the rod-like structure cannot exceed a certain critical length, $l_c$, roughly equal to but less than the full extended length of the hydrocarbon, i.e. alkyl, group. It is shown by relatively simple packing considerations that rod-like structures (i.e. rod-like micelles) are able to form when the relationship $v/a_o l_c \approx 1/2$, is approximately found.

The water soluble polymerizable monomers which produce these viscoelastic aqueous fluids of the instant invention are characterized by the formula:

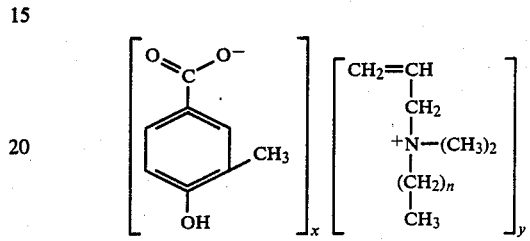

wherein n is preferably 6 to 22 straight chained or branched chained alkyl or cycloalkyl group, more preferably 8 to 20 and most preferably 8 to 18. Typical, but not limiting examples of preferred alkyl groups are hexyl, octyl, decyl, dodecyl and steryl groups. Typical, but not limiting examples of preferred anionic counterion structures are salicylic acid and its metal neutralized salts, salicylates, methyl salicylic acid and its metal neutralized salts and methyl salicylates, wherein the ratio of x to y is about 1/5 to about 5/1, more preferably about 1/2 to 2/1 and most preferably about 1/1.1 to 1.1/1.

It is known that viscoelastic surfactant fluids can be formed in aqueous media as described by H. Rehage and H. Hoffmann, Faraday Discuss. Chem. Soc. 76, 363 (1983).

The solutions of the instant invention are described as follows:

A solution comprising
(a) water; and
(b) about 0.01 to about 10 weight % of a water soluble polymerizable monomer characterized by the formula:

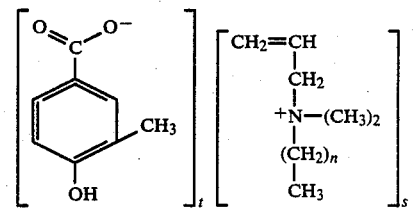

wherein n is 6 and the ratio of t to s is about 1/5 to 5/1.

A solution comprising
(a) water; and
(b) about 0.01 to about 10 weight % of a blend mixture of
(i) a water soluble polymerizable monomer characterized by the formula:

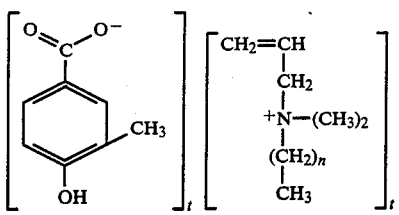

wherein n is 6 and the ratio of t to s is about 1/5 to 5/1; and (ii) a water soluble copolymer or terpolymer characterized by the formulas:

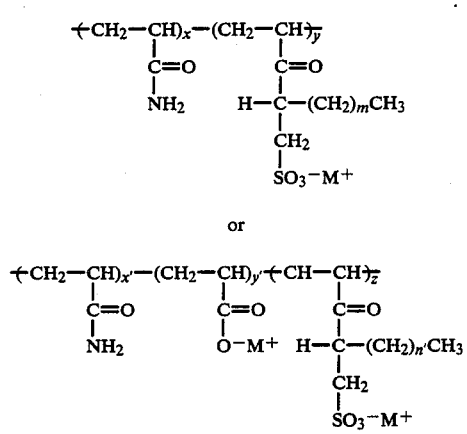

wherein x is about 90 to about 99.9 mole %, y is about 10 to 0.1 mole %, x' is about 90 to 99.9 mole z is about 0.1 to about 5.0 mole. % and $y'=100-(x'+z)$ and m and/or n' is 6 and M is a tertiary amine or a metal cation selected from the group consisting of aluminum, iron, lead, and Groups IA, IIA, IB and IIB of the Periodic Table of Elements.

DESCRIPTION OF THE PREFERRED EMBODIMENT

The following examples explain the invention, which are by way of illustration, but not of limitation.

EXAMPLE 1

Synthesis of Anionic-Hydrophobic Monomer

A representative example for the synthesis of the following monomer structures which are subsequently copolymerized to form a lightly sulfonated (anionic) alkyl-containing water soluble copolymer is described below.

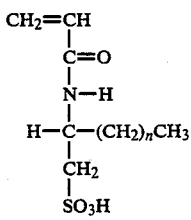

In this representative example n=9.

Into a 1 liter-4 neck round bottom flask add 300 mls of 1,2 dichloroethane and the following.

42.0 g of dodecene-1—(0 25 mole)
27.5 g of acrylonitrile—(0.50 mole)
3.3 g of triethylphosphate—(0.02 mole)

Cool mixture to approximately 0° C. Into a dropping funnel add 100 mls of 1,2-dichloroethane into which 8.0 g of sulfur trioxide (0.1 mole) has been dissolved. Carefully add dropwise this solution to the previously described cooled mixture. Keep the temperature about 0° C. with agitation until all of the sulfur trioxide solution has been added. Now allow the temperature of the mixture to rise to room temperature. In most instances, a fine, lightly yellow precipitate forms immediately and slowly settles to the bottom of the flask. This precipitate is filtered and washed with excess 1,2 dichlorethane and the lightly yellow precipitate turns a white color. The precipitate is subsequently dried in a vacuum oven at room temperature for about 24–48 hours. Elemental and NMR analysis confirms that the monomer is very pure (>99%) and has, in this specific example, the following molecular structure.

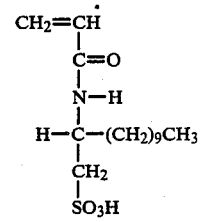

These monomeric materials can subsequently be neutralized with a large variety of materials via classical acid-base neutralization schemes.

EXAMPLE 2

Synthesis of Anionic-Hydrophobic Monomer (Alternate Synthesis)

A representative example for the synthesis of the following monomer structures which are subsequently copolymerized to form a lightly sulfonated (anionic) alkyl-containing water soluble copolymer is described below.

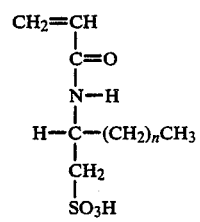

In this representative example n=9.

Into a 1 liter-4 neck round bottom flask add 300 mls of 1,2 dichloroethane and the following.

42.0 g of dodecene-1—(0.25 mole)
27.5 g of acrylonitrile—(0.50 mole)
3.3 g of triethylphosphate—(0.02 mole)

Cool mixture to approximately 0° C. Into a dropping funnel add 100 mls of 1,2-dichloroethane into which 8.0 g of sulfur trioxide (0.1 mole) has been dissolved. Carefully add dropwise this solution to the previously described cooled mixture. Keep the temperature abut 0° C. with agitation until all of the sulfur trioxide solution has been added. Now allow the temperature of the mixture to rise to room temperature. In most instances, a fine, lightly yellow precipitate forms immediately and slowly settles to the bottom of the flask. This precipitate is filtered and washed with excess 1,2 dichloroethane and the lightly yellow precipitate turns a white color. The precipitate is subsequently dried in a vacuum oven at room temperature for about 24–48 hours. Elemental and NMR analysis confirms that the monomer is very pure (>99%) and has, in this specific example, the following molecular structure.

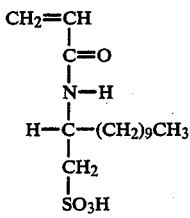

These monomeric materials can subsequently be neutralized with a large variety of materials via classical acid-base neutralization schemes.

EXAMPLE 3

Copolymer Synthesis

A representative example for the synthesis of an acrylamide copolymer containing the above described monomer (n=9) is described below.

Into a 1 liter-4 neck round bottom flask add:
300 mls distilled water
47.0 g acrylamide (99 mole %)
2.62 g sulfonate-alkyl (n=9) containing monomer (1 mole %)
0.35 g sodium hydroxide
0.05 g potassium persulfate The solution is purged with argon gas for approximately two hours at room temperature and subsequently the temperature is elevated to 50° C. After 24 hours, the copolymer is precipitated from solution with a large excess of acetone. Subsequently, the copolymer is washed several times with acetone and dried in a vacuum oven at 60° C. for 24 hours. Elemental analysis, i.e. sulfur content, showed that the copolymer contained 0.92 mole % of the sulfonate-alkyl containing monomer units. This copolymer is designated as 11868-47BR.

EXAMPLE 4

Hydrolysis

A typical example for the hydrolysis of the acrylamide-sulfonate alkyl containing copolymer is described below.

Into a small flask is dissolved with continuous agitation, 1 g of the previously synthesized copolymer (n=9) into 200 mls of distilled water. Subsequently 0.22 g of sodium hydroxide is added and the solution temperature increased from 40°–55° C. for 24 hours. The hydrolyzed copolymer is precipitated from solution with a large excess of acetone and then again thoroughly washed with a large excess of acetone. The precipitate is dried in a vacuum oven at 40° C. for 48 hours. This recovery procedure is repeated several times with only a minor change in the final elemental analysis results. The detailed hydrolysis results performed on the previously described copolymers is presented in Table 1.

TABLE 1

Hydrolysis Conditions and Final Hydrolysis Levels on a Acrylamide Alkyl Sulfonate Containing Copolymer

| Designation Level | Sodium Hydroxide (g) | Sulfonate Content (mole %) | Hydrolysis Level (mole %) |
|---|---|---|---|
| 47BR | 0 | 0.92 | 24.0 |
| 47BRH1 | 0.028 | 0.94 | 6.8 |
| 47BRH2 | 0.056 | 0.92 | 7.8 |
| 47BRH3 | 0.11 | 0.96 | 15.6 |
| 47BRH4 | 0.17 | 0.93 | 24.1 |
| 47BRH5 | 0.22 | 0.91 | 30.9 |
| 47BRH6 | 0.44 | 0.92 | 38.9 |

It should be noted that under these relatively mild hydrolysis conditions, it is clearly observed that the level of hydrolysis is markedly modified with increasing levels of added base, i.e. sodium hydroxide. In addition, it is noted that the sulfonation level and therefore, the alkyl group level remains invariant even up to high levels of hydrolysis. Therefore, the rheology of solutions containing these polymers can be compared since both the degree of polymerization and alkyl group concentration is also invariant under these hydrolysis conditions. Alternatively, acrylic acid, methacrylic acid and the like can also be used to introduce carboxyl groups into the polymer structure.

EXAMPLE 5

Cationic-Hydrophobic Monomer

Three representative examples for the synthesis of the following monomer structures to form these cationic viscoelastic monomer fluids if described below:

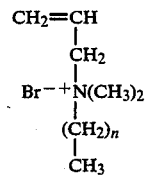

In these representative examples n=15 11868-106A), n=13 (11868-106B) and n=17 (11868-106C).

Into a small round bottom flask add the following materials together and heat to 50° C. for four hours:

11868-106A—14.2 g allyl bromine, 31.6 g N,N-dimethyl dodecylamine,
11868-106B—14.20 allyl bromide, 28.3 g N,N-dimethyl tetradecylamine,
11868-106C—14.2 g allyl bromide, 34.9 g N,N-dimethyl octadecylamine, The monomers are further purified through conventional analytical techniques. Elemental and NMR analysis confirms that the monomers are very pure (>99%) and has, in these specific examples, the following molecular structure:

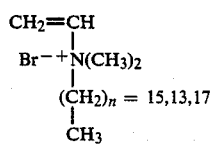

EXAMPLE 6

Preparation of Cationic Polymerizable Viscoelastic Monomer Fluids

Representative examples for the preparation of cationic polymerizable viscoelastic monomer fluids containing the three above synthesized monomers are briefly described below.

Dissolve the monomer into water and subsequently dissolve a stoichometric amount of such compounds as salicylic acid-sodium salt or methyl salicylic acid, for example. It is noted that the requirement that a stoichometric amount of the latter compounds be used is not a necessary requirement. A relatively broad range of these materials can be used for effective utilization and preparation of these unique cationic monomer viscoelastic fluids. However, stoichometric amounts of these compounds are used in the examples as a matter of convenience only. In any event, the viscosity of the fluid immediately increases to a value dependent upon the nature and concentration of the monomer and counterion.

EXAMPLE 7

Rheological Behavior

It is anticipated that the morphology that are present in these viscoelastic monomer fluids is quite complex and, undoubtedly, the dynamics of these structures can change rapidly with time, temperature, strain rate, pressure, ionic strength and the like. However, our initial findings strongly indicate that these specific monomer fluids form relatively large rod-like structures, as idealized in FIG. 1. In the figure, the spheres represent both the vinylic "head group" and the cationic region of the individual monomer. The alkyl "tails" are embedded in the rod interior due to the well known hydrophobic interactions. It is the large dimensions of the individual rods and their interactions that primarily contribute to the unusual rheology of these viscoelastic fluids. It should be noted, however, that the complete verification of the solution morphology does not in any way detract from the utilization of the novel properties exhibited by these viscoelastic fluids containing the above specified polymerizable cationic monomers.

Figure 2:
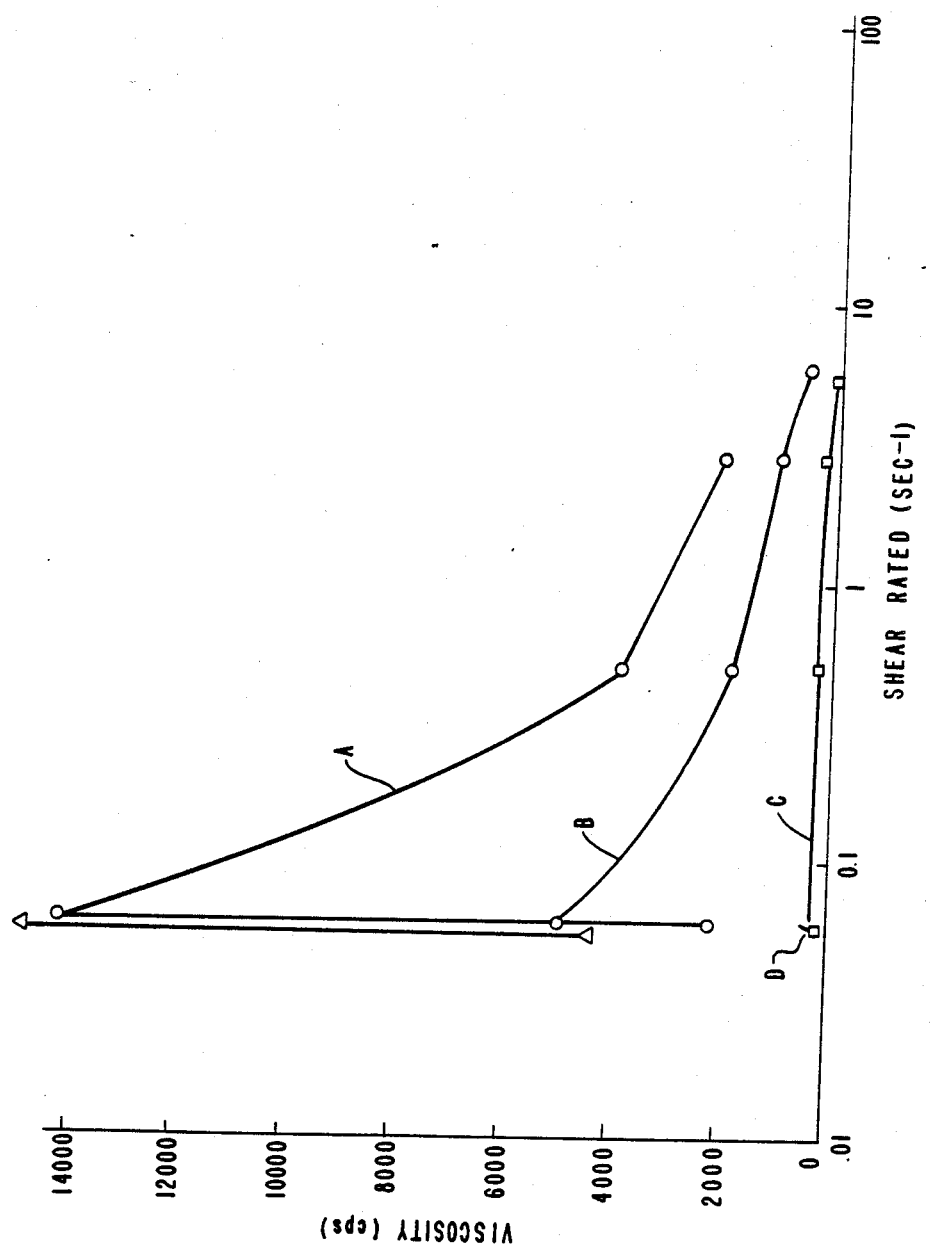
FIG. 2 depicts the rheological properties of the monomer fluids with a methylsalicyclic acid counterion.
Figure 3:
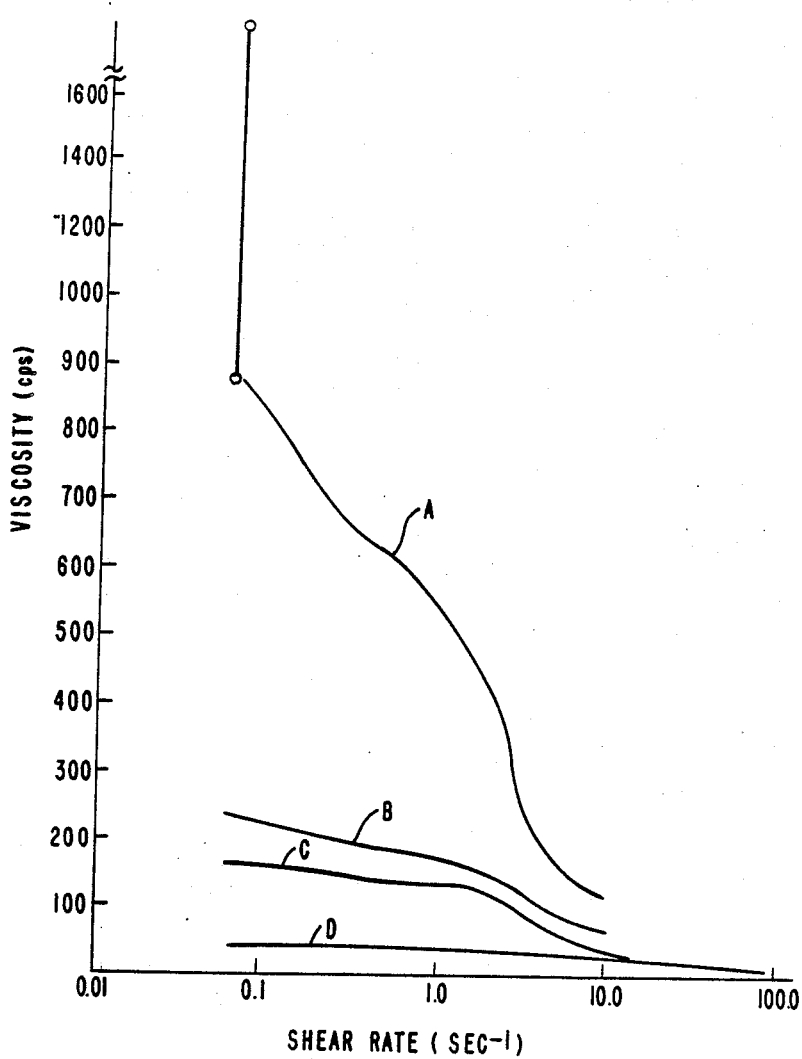
FIG. 3 depicts the rheological properties of the monomer fluid mixed with a variety of hydrolyzed alkyl-containing polymers.

FIG. 2 shows some representative rheological properties of the above described viscoelastic monomer fluids 11868-106A monomers with methylsalicylic acid counterion, hydrolyzed anionic-alkyl containing copolymers and mixtures of these two components in the same solvent system. An examination of this data clearly confirms:

1. At these low concentrations, the two individual components exhibit excellent rheological properties, but time dependent changes are observed. On the contrary, mixing these two solutions together produces rheological properties that possess time dependencies at low shear rates.
2. The mixture of the two components exhibit dramatic shear thickening and orders of magnitude increase in rheological properties at low concentrations of the two components.
3. At the appropriate concentration mixture of the two components, very large increases in the rheological properties are found as the ionic strength of the solution is increased.
4. With these specific cationic monomer structures, the rheological properties of the mixture is a strong function of the hydrolysis level on the copolymer. That is, properties deteriorate with increasing levels of anionic charge (FIG. 3).
5. It is noted that the marked time dependent rheological properties decrease rapidly with increasing anionic charge (FIG. 3).
6. Without the alkyl group situated on the copolymer chain, the mixtures exhibit very poor rheological properties, especially in comparison with the alkyl group present in the copolymer structure.

Figure 4:
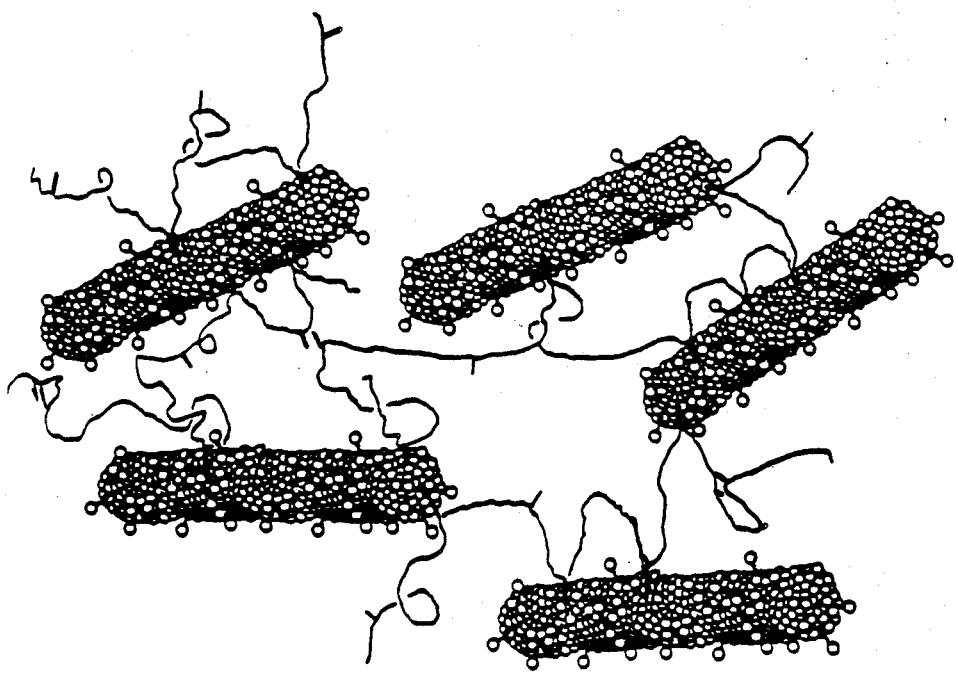
FIG. 4 depicts the connected rod-like structure of the monomer fluid with a copolymer containing alkyl groups.

FIG. 4 shows the idealized morphology of these mixtures. Briefly, due to the presence of the alkyl moieties, part of the copolymer chain preferentially "dissolves" into the hydrocarbon interior of the individual rods. However, the copolymer can span relatively large distances in the solution, it becomes highly probable for the alkyl groups to embed themselves in a number of individual rods. Of course, some alkyl groups on the same chain will find themselves in the same rod, i.e. intra-rod interactions. However, the data clearly confirms that inter-rod interactions dominate solution rheology, as noted in FIG. 4. In terms of rheological performance, this bridging mechanism enhances properties of both the colloidal rod-like morphology and the alkyl-containing copolymer in a very favorable manner—even at quite low concentrations.

In summary we described the synthesis, preparation and utilization of cationic viscoelastic monomer fluids mixed with previously described anionic-alkyl containing copolymers to impart improved and useful rheological properties to aqueous fluids. These solutions properties are markedly different than either of the two components. The specific properties can be varied over a very broad range due to the ability to readily modify either the compositional variables in the copolymers and/or in the monomer structure and/or in the counterion structure.

These types of fluid mixtures are useful as rheological control additives in a variety of drilling, completion, tertiary oil recovery operations and the like. Included in these applications are membrane uses, water borne coating additives, water based lubricant uses, agricultural chemical uses and the like.

What is claimed is:

1. A solution comprising
   (a) water; and
   (b) about 0.01 to about 10 weight % of a mixture of
      (i) a water soluble polymerizable monomer characterized by the formula:

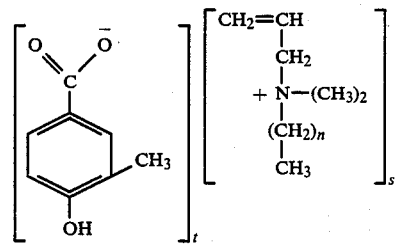

wherein n is 6 to 22 and the ratio of t to s is about 1/5 to 5/1; and (ii) a water soluble copolymer or terpolymer characterized by the formulas:

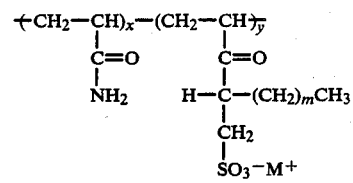

or

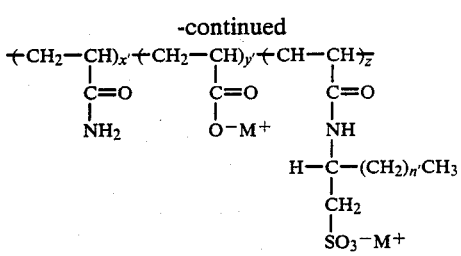

wherein x is about 90 to about 99.9 mole %, y is about 10 to 0.1 mole %, x' is about 90 to 99.9 mole %; z is about 0.1 to about 5.0 mole % and Y'=100−(x'+z) and m and n' are 6 to 22 and M is a tertiary amine or a metal cation selected from the group consisting of aluminum, iron, lead, and Groups IA, IIA, IB and IIB of the Periodic Table of Elements.

2. A solution according to claim 1, wherein a ratio of t to s is about 1/1.1 to 1.1/1.
3. A solution according to claim 1, wherein n=13.
4. A solution according to claim 1, wherein n=15.
5. A solution according to claim 1, wherein n=17.

* * * * *